United States Patent [19]
Loudas

[11] 3,901,727
[45] Aug. 26, 1975

[54] PROCESS AND COMPOSITION FOR CLEANING AND IMPARTING WATER AND OIL REPELLENCY AND STAIN RESISTANCE TO A SUBSTRATE

[75] Inventor: Basil L. Loudas, St. Paul, Minn.

[73] Assignee: Minnesota Mining and Manufacturing Company, St. Paul, Minn.

[22] Filed: Mar. 7, 1973

[21] Appl. No.: 338,935

Related U.S. Application Data

[63] Continuation-in-part of Ser. No. 122,143, March 8, 1971, abandoned.

[52] U.S. Cl. .......................... 134/4; 8/137; 106/2; 134/26; 252/89
[51] Int. Cl.² .... B08B 7/04; C11D 1/00; C09K 3/00
[58] Field of Search .......... 134/4, 26; 106/2; 8/137; 252/89; 117/121, 141

[56] References Cited
UNITED STATES PATENTS

| | | | |
|---|---|---|---|
| 3,308,078 | 3/1967 | Rogers et al. | 260/28.5 R |
| 3,362,782 | 1/1968 | Gagliardi | 8/137 X |
| 3,377,197 | 4/1968 | Erby et al. | 117/121 |
| 3,382,097 | 5/1968 | Erby et al. | 117/135.5 X |
| 3,462,294 | 8/1969 | Thomas | 106/2 X |

OTHER PUBLICATIONS

"Detergents and Emulsifiers"–1963 Annual–McCutcheon, Inc., p. 157, [TP 990 D4].

*Primary Examiner*—S. Leon Bashore
*Assistant Examiner*—Marc L. Caroff
*Attorney, Agent, or Firm*—Alexander, Sell, Steldt & DeLaHunt

[57] ABSTRACT

Container-stable alkaline cleaning compositions and processes are provided which are effective for cleaning carpets, upholstery and the like, and for imparting water and oil repellency and stain resistance thereto. One such composition comprises in an aqueous medium: detergent, water-dispersible carboxyl-containing material which forms water-insoluble zinc or zirconium salts, a water-dispersible zinc or zirconium coordination complex, a Lewis base, and a fluorochemical compound containing a fluoroaliphatic group and having acid functionality and being capable of imparting water- and oil-repellency to a substrate.

9 Claims, No Drawings

3,901,727

PROCESS AND COMPOSITION FOR CLEANING AND IMPARTING WATER AND OIL REPELLENCY AND STAIN RESISTANCE TO A SUBSTRATE

This application is a continuation-in-part of copending application Ser. No. 122,143, filed Mar. 8, 1971, now abandoned.

BACKGROUND OF THE INVENTION

1. Field of the Invention

This invention relates to cleaning compositions and, more specifically, to treatment with aqueous cleaning compositions to impart water and oil repellency and stain resistance to a substrate during the cleaning operation.

2. Description of the Prior Art

The treatment of various textile fabrics with fluorochemicals to impart water and oil repellency has been known to those in the art for several years. It has also been proposed, e.g., in U.S. Pat. Nos. 3,068,187; 3,256,230; 3,256,231; 3,277,039; and 3,503,915, to mix fluorinated polymers with nonfluorinated polymers to obtain a mixture which will impart good water and oil repellency to textiles, paper and leather.

However, such prior art systems are designed for permanent treatment of the substrate and ordinarily there is only one application of the treating composition to the fabric. For example, the textile, carpet, upholstery, etc. may be treated only at the place of manufacture and the treatment is expected to be effective for a considerable length of time. Because it is difficult to treat a textile material which has once been soiled and because of the nature of the treating process, i.e., heating, drying and curing, it is not generally feasible to re-treat the carpet, upholstery or other material in the same manner as was done initially.

It has also been proposed (U.S. Pat. No. 3,377,197) to treat previously cleaned textile fabric, leather, rugs, etc. with fluorine-containing organometallic compounds to impart resistance against soiling, staining and wetting. It has been further suggested (U.S. Pat. No. 3,382,097) to impart oil and soil repellency to textile fabric, leather, rugs, etc. by treating with a solution of a certain fluorinated organic carboxylic acid. This reference also suggests combining a detergent with a fluorochemical acid in an aqueous medium for a one-step cleaning and treating operation. However, such a cleaning and treating step does not impart water repellency. Although Netherlands Patent Appln. No. 6,606,734 suggests the dispersing of an insoluble fluorocarbon compound in a laundering composition useful for a two-step cleaning cycle, such disclosure does not provide the one-part cleaning compositions of this invention which are useful in one-step cleaning operations wherein insoluble fluorochemical salts are formed on the substrate to impart water and oil repellency in the presence of detergent residue.

Other prior art cleaning compositions, e.g., carpet shampoos, do not impart water and oil repellent properties to a substrate. Rather, many of such conventional cleaning compositions leave hydrophilic and oleophilic residues on the cleaned substrate which actually attract and hold stains, dirt, etc. Although some cleaning compositions contain ingredients designed to impart soiling resistance to a substrate, such compositions do not impart water and oil repellency.

There has not heretofore been described a one-part composition which is useful for both cleaning a substrate and imparting water and oil repellent properties thereto in one operation. Rather, the prior art compositions are primarily designed for either permanent treating or for cleaning only, not for cleaning and treating. Moreover, such compositions do not impart highly desirable resistance to water- and oil-borne stains and dry soil.

SUMMARY OF THE INVENTION

The present invention provides novel compositions and processes for the cleaning and the fluorochemical treatment of carpets, upholstery and the like to impart water and oil repellency and stain resistance thereto. Because the novel compositions contain both detergent and fluorochemical, it is possible to both clean the carpet or other substrate and also impart repellent properties thereto in one operation.

In accordance with the invention, there is provided a container-stable, water-dilutable alkaline cleaning composition which, in one embodiment, comprises in an aqueous medium:

a. one part by weight of at least one water-dispersible detergent which is capable of drying to a non-oily, non-tacky residue, b. up to about 6.5 parts by weight of at least one water-dispersible organic carboxyl-containing material selected from the group consisting of:
  i. water-dispersible mono-carboxylic acids having eight carbons or more, or alkali metal or ammonium salts thereof, and
  ii. water-dispersible alkali metal or ammonium salts of polymers containing poly-carboxylic-acid functionality, said polymers having at least three carbons in the backbone chain per carboxyl group;

said carboxyl-containing material being free of fluoroaliphatic radicals and being capable of forming solid, hydrophobic, water-insoluble zinc and zirconium salts below about pH 8, c. at least one water-dispersible Lewis base present in an amount sufficient to temporarily maintain said composition about pH 8 when said composition is exposed to the atmosphere under conditions of use, d. at least one zinc or zirconium coordination complex which is water-dispersible above about pH 8 and which provides sufficient zinc or zirconium ions below about pH 8 which are capable of combining with substantially all of the acidic radicals present in said composition, and e. up to about 1.5 parts by weight of at least one fluorochemical compound having acid functionality, said fluorochemical compound having the formula: $(R_f)_a—X—(A)_b$, where $R_f$ is a fluoroaliphatic radical, $a$ is an integer of 1 or more, X is a linking group having a valence of $a$ plus $b$ and being less electronegative than a $—CF_2—$ group, A is an acid group, and $b$ is an integer of 1 or more, said fluorochemical compound being capable of imparting water and oil repellency to a substrate.

When the novel composition is applied to a soiled substrate, e.g., a carpet, the water and the detergent clean the substrate. The Lewis base temporarily maintains the composition above about pH 8 and thereby prevents premature formation of water-insoluble zinc or zirconium salts. As the cleaning operation continues, the Lewis base gradually loses its ability to maintain the composition pH above about 8. When the composition pH is reduced below about 8, the coordination complex provides zinc or zirconium ions which form solid, non-tacky, hydrophobic, water-insoluble zinc or zirconium salts of the water-dispersible carboxyl-containing material. Surprisingly, these zinc or zirconium salts impart hydrophobicity to the substrate in the presence of the detergent residue. Below about pH 8 the fluorochemical is no longer water-dispersible and it is deposited on the substrate to impart water and oil repellency thereto.

DETAILED DESCRIPTION OF THE INVENTION

The detergents or soaps which are useful in the novel compositions are those which dry to a nonoily, nontacky residue from an aqueous medium. Thus, solid detergents which leave a dry residue are desirable. Useful anionic detergents include alkali metal or ammonium salts of fatty acids (i.e., eight carbons or more), alcohol sulfates (or sulfonates), alcohol phosphates (or phosphonates), alkyl sulfonates, alkyl phosphates (or phosphonates), polyoxyalkylene alcohol sulfates (or sulfonates), polyoxyalkylene alkyl carboxylates, and polyoxyalkylene alcohol phosphates (or phosphonates).

Nonionic detergents, either by themselves or in conjunction with anionic detergents, can also be used in the novel compositions. When nonionic detergents are used, it is preferred that they be normally solid materials, or if not solid, that they be used in amounts less than about 20% by weight of the total solids in the cleaning composition. Cationic detergents are not useful because they are not compatible with the other ingredients in the compositions.

The detergent must be water-dispersible at concentrations of at least 0.1 weight percent. The term "water-dispersible" means that the detergent is either soluble, or otherwise stably dispersible, e.g., forms a colloidal suspension, in water at the desired concentration.

Useful water-dispersible organic carboxyl-containing materials which are capable of forming solid, hydrophobic, water-insoluble zinc and zirconium salts below about pH 8 are selected from the group consisting of:

i. water-dispersible mono-carboxylic acids having eight carbons or more, or alkali metal or ammonium salts thereof, and ii. water-dispersible alkali metal or ammonium salts of polymers containing poly-carboxylic-acid functionality, the polymers having at least three carbons in the backbone chain per carboxyl group.

Preferred water-dispersible monocarboxylic acids include fatty acids such as oleic, stearic, ricinoleic, palmitic, octanoic, tallow, linoleic, and iso-stearic. The alkali metal or ammonium salts of these acids are also useful.

Preferred water-dispersible organic carboxyl-containing materials are the ammonium salts of polymers containing polycarboxylic acid functionality. Such useful materials have an acid number of 10–800. Representative of these materials are ammonium salts of styrene-maleic anhydride copolymers, safflower polyanhydrides, casein, and gelatin. Other useful materials include carboxylmethylcellulose, vinyl methyl ethermaleic anhydride copolymer, and polyacrylic acid copolymers.

The zinc and zirconium coordination complexes which are useful in the practice of this invention may be defined as those which are water-dispersible above about pH 8 and which provide zinc or zirconium ions at or below about pH 8. The zinc or zirconium coordination complex preferably provides sufficient zinc or zirconium ions to combine with substantially all of the acidic radicals present in the composition. That is, as the composition becomes less basic (i.e., more acidic) zinc or zirconium ions are provided such that, at or below about pH 8, substantially all of the zinc or zirconium in the composition is capable of combining with substantially all of the acidic radicals in the composition.

Preferably, the ligand in the coordination complex ia ammonia although other ligands (such as morpholine) which are water-dispersible and have a maximum boiling point of about 170°C. and a $pK_b$ in the range of 3.0–9.0 are also quite useful. More preferable ligands have a $pK_b$ in the range of 3.0–6.0. Preferably, only volatile ligands are used, although a nonvolatile ligand (e.g., amino acid, alanine, glycine) which forms a solid, nontacky, water-insoluble zinc or zirconium salt below about pH 8 can be used in conjunction with a volatile ligand.

Lewis bases which are included in the composition are water-dispersible and are included in an amount sufficient to temporarily maintain the composition above about pH 8 when the composition is used on a substrate. Preferably, the Lewis base is volatile. The Lewis base can also function, if desired, as the ligand in the coordination complex. For example, ammonia can be used to both temporarily maintain the composition pH above 8 and also to furnish ligands for the zinc or zirconium coordination complex.

Useful Lewis bases include ammonia, morpholine and volatile alkylamines. Representative volatile alkylamines include triethylamine, propylamine, ethylamine, isopropylamine, isobutylamine, butylamine, ethanolamine, diethanolamine, methylethylamine, diethylaminoethanol, 2-amino-2-methylpropanol, etc.

In order to prepare cleaning compositions which can be extensively diluted (e.g., up to 40 times or more), a water-dispersible salt is included in the composition which, in combination with the Lewis base, forms a buffer system which is capable of maintaining desirable pH levels under these conditions of dilution. Preferably, the anions of these water-dispersible salts form zinc or zirconium salts below about pH 8 which are solid, nontacky, and nonhydroscopic. Examples of such water-dispersible salts include ammonium carbonate, ammonium alaninate, ammonium oxalate, ammonium formate, morpholinium carbonate, morpholinium formate, and ammonium acetate. The mole ratio of the water-dispersible salt to Lewis base is generally in the range of 0.1:1 to 10:1, and preferably in about 1:1.

The fluorochemical compounds which can be used in the novel compositions are those which (a) are water-dispersible at or above about pH 8, (b) have acid functionality, and (c) form zinc or zirconium salts which are capable of imparting water and oil repellency to a substrate. Preferably, such fluorochemical compounds have at least one fluoroaliphatic radical of three carbons or more and also have an acid group whose ionization constant is greater than $1 \times 10^{-9}$. Even more preferably, the ionization constant of the acid is less than about $1 \times 10^{-3}$ but greater than $1 \times 10^{-9}$. Additionally, the fluorochemical compound must form hydrophobic, water-insoluble zinc or zirconium salts below about pH 8 which are capable of imparting water and oil repellency to a substrate.

Structurally, the fluorochemical compound is of the general formula $(R_f)_n$—X—$(A)_n$, where $R_f$ represents a fluoroaliphatic radical, X represents a linking group, A represents an acid group, $a$ is an integer of 1 or more, and $b$ is an integer of 1 or more.

$R_f$ is a fluorinated, preferably saturated, aliphatic radical of at least three carbon atoms. The skeletal carbon chain of the radical may be straight, branched, or if sufficiently large, cyclic, and may be interrupted by divalent oxygen atoms or trivalent nitrogen atoms bonded only to carbon atoms. A fully fluorinated group is preferred, but hydrogen or chlorine atoms may be present as substituents in the fluorinated aliphatic radical provided that not more than one atom of either is present in the radical for every two carbon atoms, and that the radical must at least contain a terminal perfluoroalkyl group. "Terminal" in this connection refers to the position in the skeletal chain of the radical which is furthest removed from the backbone chain of the linking group. Preferably, the fluorinated aliphatic radical contains not more than 20 carbon atoms because larger radicals result in inefficient use of the fluorine content. The term "$R_f$" has been widely used in the description of fluorochemical compounds. See, e.g., U.S. Pat. Nos. 3,442,664, 3,510,455, 3,562,156, 3,574,791, 3,661,776.

The linking group X is polyvalent and is less electronegative than a —$CF_2$— group. The valence of X is $a$ plus $b$. Representative linking groups include one or more of the following: alkylene (such as $(CH_2)_n$, where $n$ is 1 or more); arylene (such as phenylene); alkylidene; oxo; NR, where R is H or alkyl; $SO_2$; CO; S; or any combination of these groups (e.g., $SO_2NR$).

"A" is an acid group such as —COOH;

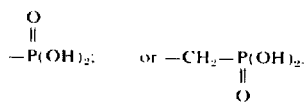

The linking group and the acid group are selected such that the resulting fluorochemical compound is stable in the composition, is water-dispersible at or above about pH 8, and forms zinc or zirconium salts which are capable of imparting water and oil repellency to a substrate.

The novel compositions are normally concentrated and can be diluted with water (e.g., up to 40 times or more) to provide cleaning and treating compositions which are more economical to use. In diluted form the compositions, for most economical use, preferably have the following concentrations of ingredients based on the total weight of the composition:

a. detergent: 0.1–1.0 weight percent,
b. water-dispersible carboxyl-containing material: 0.2–2.0 weight percent,
c. coordination complex: an amount which provides sufficient zinc or zirconium ions which are capable of combining with substantially all of the acidic radicals present in the composition (i.e., at least one equivalent of metal ion for each acidic radical in the composition).
d. Lewis base: an amount sufficient to temporarily maintain the composition pH above about 8 when the composition is applied to the substrate, and
e. fluorochemical compound: 0.05–1.5 weight percent. In all compositions, whether they be in concentrated or diluted form, the ingredients are normally present in the following weight ratios, with the amount of detergent present being designated as one part by weight:

a. detergent: 1 part by weight,
b. water-dispersible organic carboxyl-containing material: 0.1–6.5 parts, with 0.3–1 part being preferred,
c. coordination complex: an amount which provides sufficient zinc or zirconium ions which are capable of combining with substantially all of the acidic radicals present in the composition (i.e., at least one equivalent of metal ion for each acidic radical in the composition),
d. Lewis base: an amount sufficient to temporarily maintain the composition above about pH 8 when the composition is exposed to the atmosphere under conditions of use, and
e. fluorochemical compound; up to 1.5 parts, with 0.2–0.5 part being preferred for economic reasons.

The following examples are provided for illustrative purposes only and are not to be construed as limiting the scope of the invention. Unless otherwise indicated, the term "parts" means parts by weight.

Cleaning compositions within the scope of the invention can be prepared according to the following exemplary procedures.

EXAMPLE 1

First, a master batch of a buffer system and a zinc coordination complex is prepared by mixing together the following ingredients in a closed container at room temperature:

| | |
|---|---|
| $(NH_4)_2CO_3$ | 80 parts |
| Conc. ammonia (28%) | 60 parts |
| ZnO | 20 parts |
| Water (distilled) | 440 parts |

Next, a master batch of a water dispersion or solution of styrene-maleic anhydride copolymer ("SMA", commercially available from ARCO Chemical Co.) is prepared as follows: 12 parts of SMA (molecular weight 1600) is added to 66 parts of water and the mixture is heated to 60° C. with stirring for about 1 hour, after which 16 parts of "Butyl Cellosolve"* is added with stirring. Then 0.5-1 part of concentrated ammonia is added to the heated mixture to assist the solvation of the "SMA." After the "SMA" is dissolved or stably dispersed, a sufficient amount of water is added to bring the total weight of the solution to 100 parts.

*"Butyl Cellosolve" is a tradename of Union Carbide for the monobutyl ether of ethylene glycol.

A master batch of a water dispersion or solution of gelatin is prepared as follows: 8 parts of gelatin ("Velvatex," a tradname of Swift Company) is added to 80 parts of water which is then heated so as to dissolve the gelatin. Then 4 parts of concentrated ammonia are added to the solution followed by the addition of 4 parts of "Butyl Cellosolve." Sufficient water is then added to bring the total weight of the solution to 100 parts.

A typical water-dilutable cleaning composition is then prepared by adding together the following ingredients:

37 parts of the buffer and coordination complex
25 parts of the "SMA" master batch
25 parts of the gelatin master batch 10 parts of "Richinol RS 1300" (a tradename of Richardson Co. for ammonium dodecanoxy-polyethyleneoxy-ethyl sulfate)
3 parts of $(C_8F_{17}-SO_2N(C_2H_5))-CH_2COO)_2Zn$
50 parts of water For cleaning carpets and upholstery this composition is diluted up to about five times the original weight with water.

EXAMPLES 2 – 27

In a manner similar to that described in Example 1 several other cleaning compositions were prepared. Various detergents, Lewis bases, water-dispersible salts, water-dispersible carboxyl-containing material, and fluorochemicals were used in place of those shown in Example 1.

The concentrated formulations so prepared are shown in Table I below, where the pH of the compositions is in the range of 9 to 10.5, wherein the tradenames used are defined as follows:

"Richinol RS 1300" — a tradename of Richardson Company for ammonium alcohol ether sulfate (60% active)

"Richonate SXS" — a tradename of Richardson Company for sodium xylene sulfonate (40% active)

"Alipal CO-426" — a tradename of Antara Chemicals for an ammonium salt of a sulfate ester of an alkylphenoxy poly(ethyleneoxy) ethanol "Richinol A" — a tradename of Richardson Company for sodium lauryl sulfate (30% active)

"Richinol AM" — a tradename of Richardson Chemical Company for ammonium lauryl sulfate (32% active)

"Pluronic F68" — a tradename of Wyandotte Chemicals Corporation for a copolymer of hydrophobic polyoxypropylene and hydrophilic polyoxyethylene (mol. wt. 8750)

"SMA 1000" — a tradename of Arco Chemical Company for styrene-maleic anhydride copolymer (mol. wt. 1600, acid number 480)

"SPA 230" — a tradename of Pacific Vegetable Oil Corp. for maleinized safflower oils

TABLE I
CLEANING AND TREATING COMPOSITIONS

| INGREDIENTS (PARTS BY WEIGHT) | A | B | C | D | E | F | G | H | I | J | K | L | M |
|---|---|---|---|---|---|---|---|---|---|---|---|---|---|
| "Richinol RS 1300" | 5.00 | 5.00 | 5.00 | 5.00 | 5.00 | — | — | 6.70 | 5.00 | 10.00 | — | — | — |
| "Richonate SXS" | | | | | | | | 10.00 | 10.00 | | 15.00 | 20.00 | |
| "Alipal CO-436" | | | | | | | | | | | | | |
| "Richinol A" | | | | | | 15.00 | | | | | | | 12.00 |
| "Richinol AM" | | | | | | | | | | | | | 2.00 |
| "Pluronic F68" | | | | | | 5.00 | | | | | | | |
| "SMA 1000" | 2.40 | 2.40 | 2.40 | 7.50 | 6.00 | 3.00 | 3.60 | 3.96 | 4.20 | 3.00 | 3.00 | 3.00 | 2.40 |
| Gelatin | 2.00 | | 2.00 | 2.50 | 2.50 | 2.00 | 2.40 | 2.84 | 2.80 | 2.00 | 2.00 | 2.00 | |
| Casein | | 1.60 | | | | | | | | | | | |
| "SPA 230" | | | | | | | | | | | | | |
| Zinc oleate | | | | 3.00 | 3.00 | | | | | | | | |
| "Butyl Cellosolve" | 7.20 | 4.20 | 7.20 | 9.00 | 2.40 | 6.60 | 6.00 | 6.60 | 7.00 | 5.00 | 5.00 | 5.00 | 8.50 |
| Conc. Ammonia | 7.00 | 7.00 | 12.50 | 9.00 | 9.00 | 7.50 | 7.20 | 8.00 | 5.00 | 10.00 | 8.00 | 7.70 | 0.5 |
| Ammonium Carbonate | 9.00 | 9.00 | 8.40 | 11.25 | 11.25 | 10.00 | 9.30 | 10.60 | 6.70 | 13.33 | 10.60 | 10.25 | 0.2 |
| Zn (as ZnO) | 5.20 | 5.20 | 4.80 | 6.56 | 6.56 | 2.47 | 2.37 | 2.66 | 1.66 | 3.33 | 2.66 | 2.54 | |
| Beta-alanine | | | | | | | | | | | | | |
| $C_8F_{17}SO_2-N(C_2H_5)-CH_2COOH$ | | | | | 4.50 | | | | | | | | 0.7 |
| $(C_8F_{17}SO_2-N(C_2H_5)CH_2COO)_2Zn$ | 2.00 | 2.00 | 2.00 | 0.90 | | | 3.00 | | | | | | |
| $C_8F_{17}SO_2N(C_2H_5)CH_2CH_2-O-P(=O)(OH)_2$ | | | | | | 5.00 | | 4.00 | | | | | 0.4 |
| $(C_8F_{17}SO_2N(C_2H_5)CH_2CH_2-O)_2=P(=O)-OH$ | | | | | | | | | | | 3.00 | | |
| $CF_3(CF_2)CF-(CF_2)n-C(=O)-NHCH_2COOH$ $n=2-5$ | | | | | | | | | | | 3.00 | | |
| $C_7F_{15}COONH_4$ | | | | | | | | | | 3.00 | | | |
| $(CF_2)_x(COOH)_2$ | | | | | | | | 4.00 | | | | | |
| Water | | | | | | | | | | | | | |
| Total Weight (parts) | 120 | 120 | 120 | 150 | 150 | 150 | 150 | 167 | 167 | 200 | 150 | 150 | 165 |

| INGREDIENTS (PARTS BY WEIGHT) | N | O | P | Q | R | S | T | U | V | W | X | Y | Z |
|---|---|---|---|---|---|---|---|---|---|---|---|---|---|
| "Richinol RS 1300" | | 12.50 | 5.00 | | 5.00 | | | | 5.00 | 10.00 | | | 5.00 |
| "Richonate SXS" | | | 5.00 | | 5.00 | 5.00 | 5.00 | | | | 20.00 | | |
| "Alipal CO-436" | 5.00 | | | | | | | | | | | | |
| "Richinol A" | | | | | | | | | | | | 20.00 | |
| "Pluronic F68" | | | | | | | | | | | | | |
| "SMA 1000" | 2.40 | 9.00 | 3.00 | 2.02 | | | 6.00 | 6.00 | 3.00 | 3.00 | 3.00 | 3.00 | 3.00 |
| Gelatin | 2.00 | 3.00 | 2.00 | 1.28 | | | 4.00 | 4.00 | 2.00 | 2.00 | 2.00 | 2.00 | 2.00 |
| Casein | | | | | | | | | | | | | |
| "SPA 230" | | | | | | 6.00 | | | | | | | |
| Zinc oleate | | | | | | | 3.00 | 3.00 | | | | | |

TABLE I – CLEANING AND TREATING COMPOSITIONS – Continued

| INGREDIENTS (PARTS BY WEIGHT) | N | O | P | Q | R | S | T | U | V | W | X | Y | Z |
|---|---|---|---|---|---|---|---|---|---|---|---|---|
| "Butyl Cellosolve" | 7.60 | 18.00 | 5.00 | 9.40 | 2.00 | 7.60 | 13.00 | 13.00 | 6.00 | 5.00 | 5.00 | 9.00 | 5.00 |
| Conc. Ammonia | 11.50 | 28.00 | 8.70 | 6.10 | 9.90 | 10.00 | 10.00 | 10.00 | 10.00 | 3.70 | 7.65 | 7.00 | 16.50 |
| Ammonium Carbonate | 10.00 | 15.00 | 11.60 | 6.00 | 12.50 | 13.00 | 13.00 | 13.00 | | 4.93 | 9.33 | | |
| Zn (as ZnO) | 5.00 | 8.55 | 2.98 | 1.50 | 3.17 | 3.30 | 3.30 | 3.30 | 2.25 | 1.23 | 2.33 | | 9.50 |
| Beta-alanine | | | | | | | | | 11.20 | | | | |
| $C_8F_{17}SO_2-N(C_2H_5)-CH_2COOH$ | | | | | 4.20 | 4.20 | | | | | | | |
| $(C_8F_{17}SO_2-N(C_2H_5)CH_2COO)_2Zn$ | | 3.50 | | | | | | | | 3.00 | 3.50 | | 3.00 |
| $C_8F_{17}SO_2N(C_2H_5)CH_2CH_2-O-P(OH)_2 \ \|\!\|\ O$ | | 2.00 | | 6.40 | | 3.20 | | 0.60 | 3.20 | | | 8.00 | |
| $(C_8F_{17}SO_2N(C_2H_5)CH_2CH_2-O)_2=P-OH \ \|\!\|\ O$ | | | | | | | | | | | | | |
| $CF_3(CF_3)CF-(CF_2)_n-C-NHCH_2COOH \ \|\!\|\ O$ $n=2-5$ | | | | | | | | | | | | | |
| $C_7F_{15}COONH_4$ | | | | | | | | | | | | | |
| $(CF_2)_x(COOH)_2$ | | | | | | | | | | | | | |
| Water | | | | | | | | | | | | | |
| Total Weight (parts) | 120 | 250 | 150 | 120 | 100 | 160 | 200 | 200 | 150 | 150 | 150 | 150 | 125 |

EXAMPLE 28

The cleaning compositions shown in Table I were each tested for water and oil repellency according to the following procedure.

Several beige colored nylon carpet swatches, cut from the same carpet, (15 ounce pile/square yard) are first shampooed with a conventional commercial wet shampoo and allowed to dry. The carpet swatches are then vacuum cleaned (4–6 passes) and tested for water and oil repellency. When oil and water droplets are placed on the carpet swatches at this point, there is instant penetration and, thus, no repellency.

Samples of each of the diluted cleaning compositions from Table I are applied to separate carpet swatches with a brush or shampooer in the amount of 50 grams of diluted cleaning composition for each square foot of carpet. The cleaning compositions are allowed to dry and then the carpet swatches are vacuum cleaned. (It had previously been determined that 50 grams of cleaning composition per square foot of carpet was sufficient for good cleaning of a heavily soiled carpet).

In Table II there are compiled the results of various repellency tests. Oil repellency is tested using the Hydrocarbon Resistance Test (AATCC 118-1966T). Briefly, this test comprises placing drops of standard test liquids (a selected series of hydrocarbons with varying surface tensions) on the treated fabric surface and then observing for wetting of the surface by the drops. The oil repellency rating increases as the ability of the fabric to resist wetting increases. The rating scale ranges from 1 (poor oil repellency) to 8 (excellent oil repellency). A rating of 2 or higher is acceptable.

Water repellency is tested by placing small droplets of water on the treated fabric surface and then observing for wetting of the surface. The rating scale is described at the bottom of Table II. Water: isopropanol repellency is tested according to the same manner as water repellency, using water:isopropanol (80:20) droplets.

TABLE II

| Cleaning Composition | Oil* | Repellency Water | Water:IPA (80:20) |
|---|---|---|---|
| A | 3 | G | F |
| B | 4 | G | G |
| C | 4 | G | F |
| D | 2 | G | P |
| E | 3 | E | G |
| F | 5 | E | G |
| G | 4 | G | F |
| H | 5 | E | E |
| I | 2 | P | P |
| J | 3 | P | P |
| K | 3 | G | P |
| L | 3 | G | F |
| M | 4 | F | P |
| N | 4 | E | G |
| O | 5 | E | E |
| P | 5 | E | G |
| Q | 6 | E | E |
| R | 5 | E | G |
| S | 3 | E | G |
| T | 0 | G | F |
| U | 3 | E | G |
| V | 3 | G | F |
| W | 4 | E | G |
| X | 5 | E | G |
| Y | 4 | P | P |
| Z | 4 | G | P |

*The higher the number the greater the resistance.
P – Poor (immediate penetration)
F – Fair (delayed penetration, i.e., less than 1 minute)
G – Good (no penetration for at least 30 minutes)
E – Excellent (no wetting or penetration for at least one hour)

EXAMPLE 29

Several soiling tests were conducted in order to compare several of the novel cleaning compositions of the invention with conventional shampoo compositions.

A 30 gram sample of each shampoo and cleaning composition was used to clean individual beige nylon carpet swatches (9 inches square and cut from the same carpet). The carpet swatches were then dried, vacuum cleaned, and subjected to a 20 minute artificial soiling cycle. After soiling, the swatches were vacuum cleaned before reflectance readings were taken.

Subsequent soiling cycles were as follows: Each carpet swatch was then cleaned again with 30 grams of the respective shampoo or cleaning composition used previously on that swatch. After drying, the carpet swatches were vacuumed, resoiled for 20 minutes, vacuum cleaned, and then reflectance readings were again taken.

The result of the soiling tests are reported in Table III.

The artificial soiling test comprises (a) securing carpet swatches to the inside walls of a cylinder which contains 100 small ceramic ball mill cylinders and a soiling formulation, and (b) rotating the cylinder at 42 revolutions per minute for 20 minutes. The cylinder is 13⅛ inches high and has an inside diameter of 9⅞ inches. The carpet swatches are ordinarily secured to the inside walls of the cylinder with double-coated pressure-sensitive adhesive. The small ceramic ball mill cylinders are three-fourths inch by three-fourths inch in size and weigh about 23 grams.

The common soiling formulation used in the soiling test comprises:

| | |
|---|---|
| Peat Moss | 70 parts |
| Gray Portland Cement (Type 1) | 30 parts |
| Silica gel (200 mesh) | 30 parts |
| Clay | 30 parts |
| Sodium chloride (about 80 mesh) | 7 parts |
| Gelatin | 7 parts |
| Carbon black | 23 parts |
| Red iron oxide | 1 part |
| Stearic acid | 3.2 parts |
| Oleic acid | 3.2 parts |
| Peanut oil | 6 parts |
| Lanolin | 2 parts |

The reflectance readings were measured using a Model 670 Photovolt Meter (Photovolt Corporation). Briefly, the test comprises measuring the amount of light which is reflected from the carpet surface. The cleaner the carpet, the greater the reflectance. A control carpet swatch which has not previously been soiled gives a reflectance reading of 70–72.

TABLE III

| Cleaner | Photovolt Readings* | | | |
|---|---|---|---|---|
| | 1st Soiling Cycle | 2nd Soiling Cycle | 3rd Soiling Cycle | 4th Soiling Cycle |
| A (from Table 1) | 50 | 65 | 60 | 57 |
| B (from Table 1) | 52 | 63 | 59 | 58 |
| C (from Table 1) | 51 | 56 | 59 | 56 |
| "Bissell Carpet Shampoo" | 47 | 44 | 47 | 44 |
| "Blue Lustre" | 47 | 44 | 43 | 44 |
| "Grace Lee" | 48 | 46 | 40 | 39 |
| "Duoway" | 49 | 54 | 44 | 47 |

*The higher the reading the cleaner the carpet.

"Bissell Carpet Shampoo" is a tradename of Bissell, Inc. "Blue Lustre" is a tradename of Earl Grissmer Co., Inc. "Grace Lee" is a tradename of Grace Lee Products, Duoway""duoway" is a tradename of Solarine Co.

EXAMPLE 30

Soiling tests similar to those described in Example 29 were conducted on acrylic carpet swatches. The results are compiled in Table IV.

TABLE IV

| Cleaner | Photovolt Readings | | |
|---|---|---|---|
| | 1st Soiling Cycle | 2nd Soiling Cycle | 3rd Soiling Cycle |
| D (from Table 1) | 56 | 56 | 57 |
| E (from Table 1) | 52 | 54 | 59 |
| "Grace Lee" | 47 | 45 | 43 |

Although it is preferred to use the compositions of the invention for cleaning and treating textile substrates, e.g., and upholstery, these compositions also have utility for cleaning and treating various other substances, e.g., metal surfaces, plastered surfaces, or ceramic surfaces. It will also be recognized that the novel compositions can be used solely for imparting water- and oil-repellent properties to a substrate by omitting the detergent and/or the organic acid from the formulation. It will also be recognized that a novel cleaning and treating composition can be obtained, which is capable of imparting water repellency to a substrate, by omitting the fluorochemical from the formulation.

In order to increase the adhesion of the insoluble zinc salts to the textile substrate, and to improve the durability of the treatment, a binder can also be included in the compositions of the invention. Preferably, such a binder comprises polar, water-soluble, high molecular weight resins. for example, useful binders include polyvinylpyrrolidone, polyvinylalcohol and natural gums. Binders can be used in amounts up to about 20% by weight of the total solid residue which is deposited on the treated substrate.

I claim:

1. A container-stable, water-dilutable, alkaline cleaning composition capable of removing soil and stains from a substrate and imparting water and oil repellency and stain resistance to such substrate, the composition consisting essentially of in an aqueous medium:
   a. one part by weight of at least one water-dispersible detergent which is capable of drying to a nonoily, nontacky residue,
   b. up to about 6.5 parts by weight of at least one water-dispersible organic carboxyl-containing material selected from the group consisting of:
      i. water-dispersible mono-carboxylic acids having eight carbons or more, or alkali metal or ammonium salts thereof, and
      ii. water-dispersible alkali metal or ammonium salts of polymers containing poly-carboxylic-acid functionality, said polymers having at least three carbons in the backbone chain per carboxyl group;

said carboxyl-containing material being free of fluoroaliphatic radicals and being capable of forming solid, hydrophobic, water-insoluble zinc and zirconium salts below about pH 8, c. at least one water-dispersible Lewis base present in an amount sufficient to temporarily maintain said composition above about pH 8 when said composition is exposed to the atmosphere under conditions of use, said Lewis base being selected from the group consisting of ammonia, morpholine, and volatile alkylamines, d. at least one zinc or zirconium coordination complex which is water-dispersible above about pH 8 and which provides sufficient zinc or zirzonium ions below about pH 8 which are capable of combining with substantially all of the acidic radicals present in said composition, and e. up to about 1.5 parts by weight of at least one fluorochemical compound having acid functionality, said fluorochemical compound having the formula: $(R_f)_a—X—(A)_b$, where $R_f$ is a fluoroaliphatic radical, $a$ is an integer of 1 or more, X is a linking group having a valence of $a$ plus $b$ and being less electronegative than a $—CF_2—$ group, A is an acid group, and $b$ is an integer of 1 or more, said fluorochemical compound being capable of imparting water and oil repellency to a substrate.

2. A cleaning composition in accordance with claim 1 wherein said Lewis base comprises ammonia.

3. A container-stable, water-dilutable, alkaline cleaning composition capable of removing soil and stains from a substrate and imparting water and oil repellency and stain resistance to such substrate, the composition consisting essentially of in an aqueous medium:

a. one part by weight of at least one water-dispersible detergent which is capable of drying to a nonoily, nontacky residue, b. up to about 5 parts by weight of at least one water-dispersible organic carboxyl-containing material selected from the group consisting of:
  i. water-dispersible mono-carboxylic acids having eight carbons or more, or alkali metal or ammonium salts thereof, and
  ii. water-dispersible alkali metal or ammonium salts of polymers containing poly-carboxylic-acid functionality, said polymers having at least 3 carbons in the backbone chain per carboxyl group;

said carboxyl-containing material being free of fluoroaliphatic radicals and being capable of forming solid, hydrophobic, water-insoluble zinc and zirconium salts below about pH 8, c. at least one water-dispersible Lewis base and at least one water-dispersible salt which, in combination with said Lewis base, forms a buffer system capable of only temporarily maintaining said composition above about pH 8 when said composition is exposed to the atmosphere under conditions of use, said Lewis base being selected from the group consisting of ammonia, morpholine, and volatile alkylamines, d. at least one zinc or zirconium coordination complex which is water-dispersible above about pH 8 and which provides sufficient zinc or zirconium ions below about pH 8 which are capable of combining with substantially all of the acidic radicals present in said composition; and e. up to about 1.5 parts by weight of at least one fluorochemical compound having acid functionality, said fluorochemical compound having the formula: $(R_f)_a—X—(A)_b$, where $R_f$ is a fluoroaliphatic radical, $a$ is an integer of 1 or more, X is a linking group having a valence of $a$ plus $b$ and being less electronegative than a $—CF_2—$ group, A is an acid group, and $b$ is an integer of 1 or more, said fluorochemical compound being capable of imparting water and oil repellency to a substrate.

4. A cleaning composition in accordance with claim 3 wherein said Lewis base comprises ammonia.

5. A cleaning composition in accordance with claim 4 wherein said water-dispersible salt comprises ammonium carbonate.

6. A container-stable, water-dilutable, alkaline cleaning composition capable of removing soil and stains from a substrate and imparting water repellency to such substrate, the composition consisting essentially of in an aqueous medium:

a. one part by weight of at least one water-dispersible detergent which is capable of drying to a nonoily, nontacky residue, b. up to about 6.5 parts by weight of at least one water-dispersible organic carboxyl-containing material selected from the group consisting of:
  i. water-dispersible mono-carboxylic acids having eight carbons or more, or alkali metal or ammonium salts thereof, and
  ii. water-dispersible alkali metal or ammonium salts of polymers containing poly-carboxylic-acid functionality, said polymers having at least three carbons in the backbone chain per carboxyl group;

said carboxyl-containing material being free of fluoroaliphatic radicals and being capable of forming solid, hydrophobic, water-insoluble zinc and zirconium salts below about pH 8, c. a Lewis base present in an amount sufficient to temporarily maintain said composition above about pH 8 when said composition is exposed to the atmosphere under conditions of use, said Lewis base being selected from the group consisting of ammonia, morpholine, and volatile alkylamines, d. at least one zinc or zirconium coordination complex which is water-dispersible above about pH 8 and which provided sufficient zinc or zirconium ions below about pH 8 which are capable of combining with substantially all of the acidic radicals present in said composition.

7. A cleaning composition in accordance with claim 1 wherein said carboxyl-containing material is an ammonium salt of a styrene-maleic anhydride copolymer and wherein said fluorochemical compound comprises an organic acid having an ionization constant less than about $1 \times 10^{-3}$ but greater than $1 \times 10^{-9}$.

8. A cleaning composition in accordance with claim 3 wherein said carboxyl-containing material is an ammonium salt of a styrene-maleic anhydride copolymer and wherein said fluorochemical compound comprises an organic acid having an ionization constant less than about $1 \times 10^{-3}$ but greater than $1 \times 10^{-9}$.

9. A process for removing soil and stains from a substrate and imparting water and oil repellency and stain resistance to such substrate, the process comprising the steps of:
 a. contacting said substrate with an effective cleaning amount of the cleaning composition of claim 1,
 b. substantially drying said substrate so that the pH of said composition is reduced below about 8, thereby forming a solid residue on said substrate, and
 c. vacuum cleaning said substrate.

* * * * *

UNITED STATES PATENT OFFICE
CERTIFICATE OF CORRECTION

PATENT NO. : 3,901,727
DATED : August 26, 1975
INVENTOR(S) : BASIL L. LOUDAS

It is certified that error appears in the above-identified patent and that said Letters Patent are hereby corrected as shown below:

Col. 2, line 42, after "composition", first occurrence, add -- above -- .

Col. 5, line 66, the sentence -- In all compositions...parts by weight: -- should start a new paragraph.

Col. 7 & 8, Table I, "$C_7F_{15}COONH_1$" should read -- $C_7F_{15}COONH_4$ -- .

Col. 8, line 6, "Alipal CO-426" should read -- "Alipal CO-436" -- .

Col. 11, line 61, "Duoway""duoway" should read -- Inc. "Duoway" -- .

Col. 14, line 51, "provided" should read -- provides -- .

Col. 12, line 29, "for" should read -- For -- .

*Signed and Sealed this*

*twenty-fifth* Day of *November 1975*

[SEAL]

Attest:

RUTH C. MASON
*Attesting Officer*

C. MARSHALL DANN
*Commissioner of Patents and Trademarks*